United States Patent
Huss et al.

(10) Patent No.: US 11,108,425 B1
(45) Date of Patent: Aug. 31, 2021

(54) PAUSE CONTROL FOR A CALIBRATION SEQUENCE

(71) Applicant: Cadence Design Systems, Inc., San Jose, CA (US)

(72) Inventors: Scott David Huss, Cary, NC (US); Loren B. Reiss, Raleigh, NC (US); Fred Staples Stivers, Raleigh, NC (US); Matthew Robert Collin, Cary, NC (US); James Lee House, Raleigh, NC (US); Ramakrishna Kasukurthi, Cary, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/005,092

(22) Filed: Aug. 27, 2020

(51) Int. Cl.
| | |
|---|---|
| *H04B 1/38* | (2015.01) |
| *H04L 5/16* | (2006.01) |
| *H04B 1/401* | (2015.01) |
| *H04B 1/58* | (2006.01) |
| *H04B 1/48* | (2006.01) |

(52) U.S. Cl.
CPC ............... *H04B 1/401* (2013.01); *H04B 1/48* (2013.01); *H04B 1/58* (2013.01)

(58) Field of Classification Search
CPC ............. H04B 1/401; H04B 1/48; H04B 1/58
USPC ....................................................... 375/219
See application file for complete search history.

(56) References Cited

U.S. PATENT DOCUMENTS

| | | | |
|---|---|---|---|
| 6,390,579 B1 * | 5/2002 | Roylance ........... | G06K 15/1223 332/109 |
| 2003/0034848 A1 * | 2/2003 | Norman ............... | H03K 3/0315 331/46 |

* cited by examiner

*Primary Examiner* — Tanmay K Shah
(74) *Attorney, Agent, or Firm* — Schwegman Lundberg & Woessner, P.A.

(57) ABSTRACT

A calibration control component within a transmit (TX) or receive (RX) device executes a calibration sequence to ensure reliable data transmission and reception within the device. The calibration sequence comprises a set of calibration functions that are sequentially executed. The calibration control component detects a pause function being enabled based on a pause function configuration register. Based on detecting the pause function being enabled, the calibration control component pauses execution of the calibration sequence.

20 Claims, 4 Drawing Sheets

PAUSE CONTROL FOR A CALIBRATION SEQUENCE

TECHNICAL FIELD

The present disclosure generally relates to integrated circuits (ICs). In particular, the present disclosure addresses pause control for a physical layer calibration sequence.

BACKGROUND

A physical layer (PHY) is an electronic circuit that connects a link layer device to a physical medium such as an optical fiber or copper cable. A calibration sequence is typically executed at system start-up to ensure reliable data transmission and reception by the PHY. Traditionally, during the calibration sequence, a number of calibration functions are executed sequentially without interruption.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address systems, methods, devices, and circuits to provide pause control during execution of a calibration sequence in a TX or RX device (e.g., a PHY device). As noted above, a calibration sequence can include a number of calibration functions executed at the device to ensure reliable data transmission and reception. A calibration control component within the device is responsible for invoking each calibration function in executing the calibration sequence. A pause function configuration register within the device can be used to introduce pauses in the calibration sequence. A pause can be introduced in the calibration sequence to allow for fine tuning between calibration functions or to facilitate diagnostic testing, for example. The pause configuration register indicates whether a pause is to be introduced prior to execution of any one or more calibration functions or after the calibration sequence has been executed. In an example, when a bit in the pause configuration register is enabled, a corresponding control signal from the calibration control component is masked off, thereby preventing execution of a calibration function and introducing a pause in the execution of the calibration sequence. Once the bit in the pause configuration register is disabled, the control signal mask is removed and the execution of the calibration sequence is resumed.

Figure 1A:
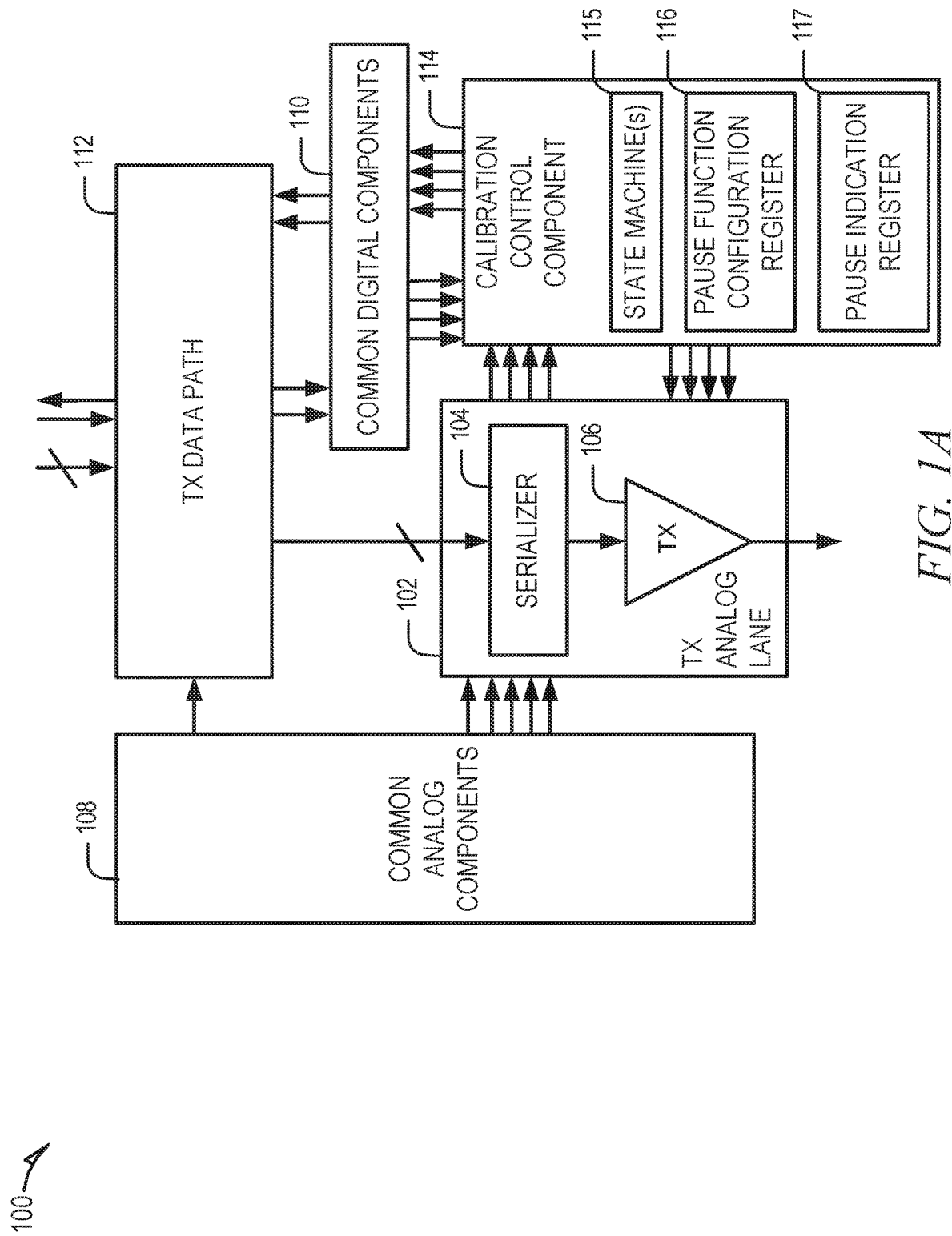
FIG. 1A is a system diagram illustrating a transmit (TX) PHY, according to some example embodiments.

With reference to FIG. 1A, a TX PHY 100 for serial data transfer is illustrated, according to some example embodiments. The TX PHY 100 can include multiple TX analog lanes, though only a single TX analog lane 102 is illustrated for ease of description. The TX analog lane 102 includes a serializer 104 to serialize data and a transmitter 106 to transmit the serialized data.

Each of the TX analog lanes of the TX PHY 100 are coupled to common analog components 108 and common digital components 110. The common analog components 108 can, for example, include a phase locked loop (PLL) circuit, a bandgap circuit, and a high-speed clock distribution network. The common digital components 110 can include a start-up state machine to define behavior of the TX PHY 100 at start-up (e.g., executing a calibration sequence), a PLL calibration component, a bandgap calibration component, and a TX clock calibration component. A TX data path 112 of the TX PHY 100 may include a scrambler component, an encoding component, an encoded data interleaving component, a built-in self-test (BIST) pattern generation component, and a loopback BIST data capture and checking component.

The TX PHY 100 further includes a calibration control component 114. The calibration control component 114 controls execution of a calibration sequence within the TX PHY 100 to ensure reliable data transmission. The calibration sequence includes a set of calibration functions that are sequentially executed. The calibration control component 114 comprises one or more machine(s) 115 to initiate and sequence through the set of calibration functions. The state machine(s) 115 can be implemented using any one or more of programmable logic devices, programmable logic controllers, logic gates, flip flops or relays. Each calibration function is performed by a calibration component such as the PLL calibration component, bandgap calibration component, and TX clock calibration component referenced above. To execute a particular calibration function within the calibration sequence, the calibration control component 114 sends a control signal to the corresponding calibration component.

The calibration control component 114 also includes a pause control mechanism to facilitate pauses during the execution of the calibration sequence. To this end, the calibration control component 114 includes a pause function configuration register 116. The pause function configuration register 116 stores indications of enabled pause functions associated with a calibration sequence. Each pause function is associated with a particular calibration function. An enabled bit in the pause function configuration register 116 may indicate that a pause function is to be invoked either prior to or subsequent to an associated calibration function. Consistent with some embodiments, bits in the pause function configuration register are used to control inputs to the one or more state machines 115 to introduce one or more pauses into the calibration sequence. Consistent with some other embodiments, an enabled bit in the pause function configuration register 116 masks off a control signal provided from the calibration control component 114, thereby preventing the corresponding calibration component from receiving the signal and executing the calibration function. Once the bit is disabled, the control signal is unmasked; the control signal, once received by the corresponding calibration component, causes the calibration component to execute a calibration function.

As shown, the calibration component 114 also comprises a pause indication register 117 to store indications of pauses introduced into the calibration sequence. The pause indication register 117 can indicate that the calibration sequence has been paused or can more specifically indicate where in the calibration sequence the pause occurs. For example, the pause indication register can include a plurality of bits, where each bit indicates a pause with respect to a particular calibration function (either before or after).

Figure 1B:
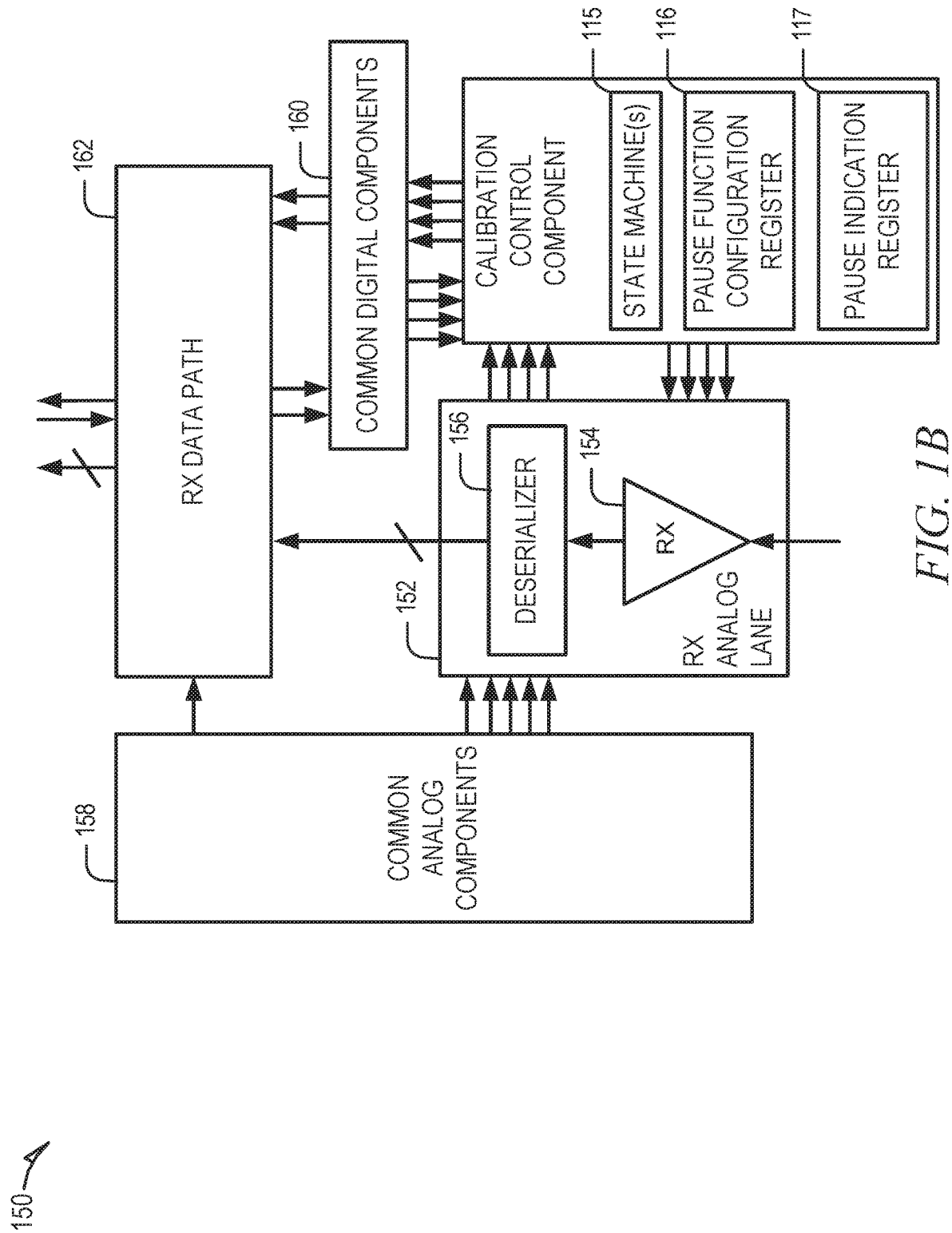
FIG. 1B is a system diagram illustrating a receive (RX) physical layer (PHY), according to some example embodiments.

With reference to FIG. 1B, a RX PHY 150 for serial data transfer is illustrated, according to some example embodiments. The RX PHY 150 can include multiple RX analog lanes, though only a single RX analog lane 152 is illustrated for ease of description. The RX analog lane 152 includes a receiver 154 to receive serialized data and a deserializer 156 to deserialize the serialized data.

Each of the RX analog lanes of the RX PHY 150 is coupled to common analog components 158 and common digital components 160. The common analog components 158 can include, for example, a bandgap circuit and a high-speed clock distribution network. The common digital components 160 can include a start-up state machine to define behavior of the RX PHY 150 at system start-up, and a bandgap calibration component. A RX data path 162 of the RX PHY 150 may include a de-scrambler component, a decoding component, an encoded data de-interleaving component, and a BIST pattern generation checker.

Similar to the TX PHY 100, RX PHY 150 further includes a calibration control component 114 to control execution of a calibration sequence within the RX PHY 150 to ensure reliable data reception. As with the TX PHY 100, the calibration control component 114 of the RX PHY 150 includes a pause function configuration register 116 to provide a pause function control mechanism in the manner described above as well as a pause indication register 117 to store indications of pauses introduced into the calibration sequence.

Figure 2:
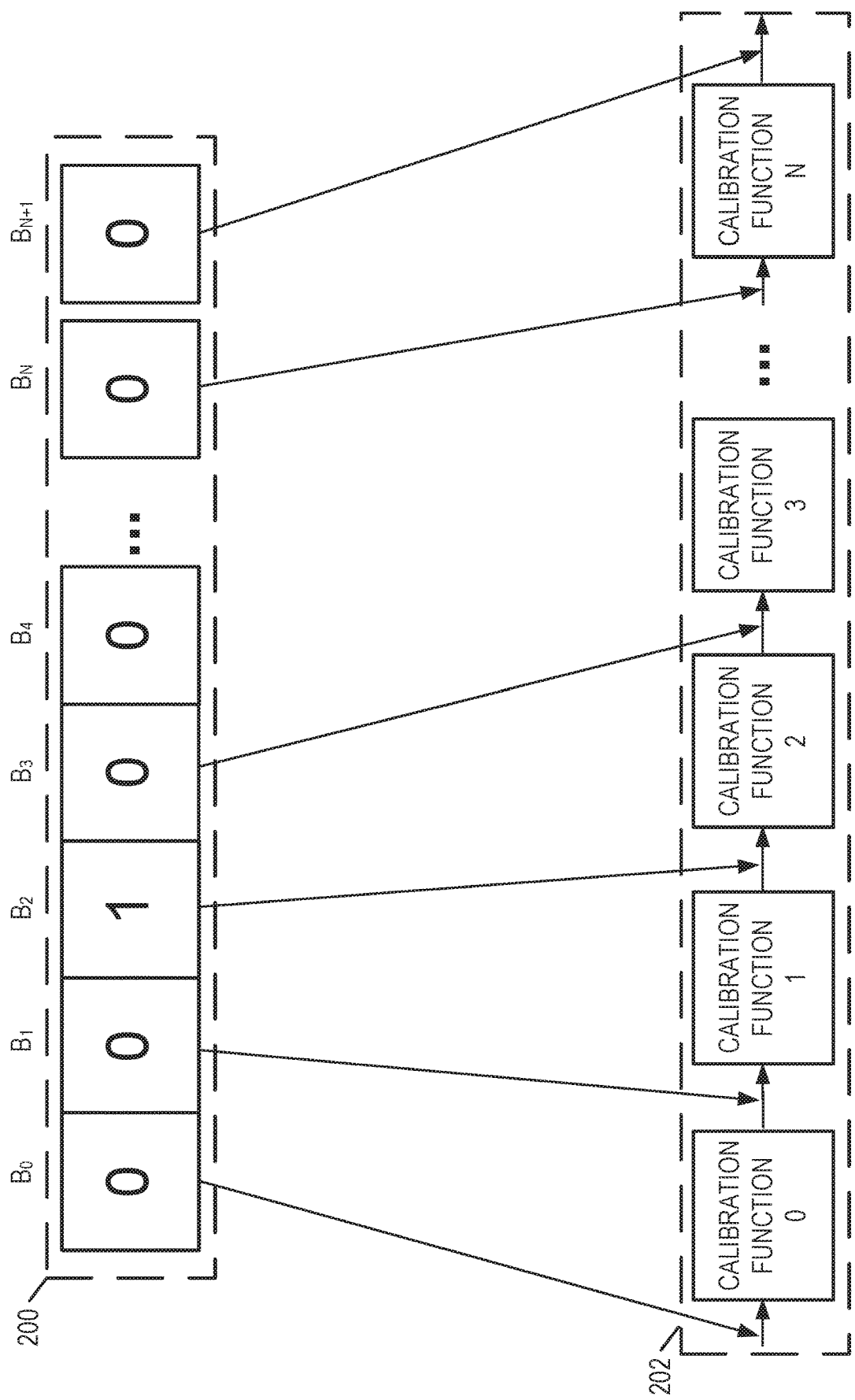
FIG. 2 is a conceptual diagram illustrating a pause function configuration register that enables pause control for a calibration sequence executed by either the RX or TX PHY, according to some example embodiments.

FIG. 2 is a conceptual diagram illustrating an example pause function configuration register 200 that enables pause control for a calibration sequence 202 for a PHY component, according to some example embodiments. As shown, the configuration register 200 includes N number of calibration functions (calibration function 0-calibration function N) that are sequentially executed. The pause function configuration register 200 includes N+1 bits ($B_0$-$B_{N+1}$). Each bit in the pause configuration register indicates whether a pause function is enabled or disabled. That is, an enabled bit (a binary '1') indicates that a pause function is enabled while a disabled bit (a binary '0') indicates that the pause function is disabled. Each pause function is associated with a particular calibration function in the calibration sequence 202. An enabled bit in the pause function configuration register 200 may indicate that a pause function is to be invoked either prior to or subsequent to an associated calibration function. As a general example, bits $B_0$ to $B_N$ are associated with pause functions that can be invoked to introduce a pause prior to execution of a particular calibration function in the calibration sequence 202 while the bit $B_{N+1}$ is associated with a pause function that can be invoked to introduce a pause after execution of the last calibration function but prior to termination of the calibration sequence 202.

In the example presented in FIG. 2, bit $B_2$ is enabled, thereby indicating that a pause function is to be invoked prior to execution of the calibration function 2. Thus, during execution of the calibration sequence 202, the calibration control component 114 detects the enabled bit $B_2$ and in response to detecting the bit being enabled (a binary value of '1'), the calibration control component 114 pauses execution of the calibration sequence 202 prior to execution of the calibration function 2. The calibration control component 114 resumes execution of the calibration sequence upon detecting the bit $B_2$ being disabled (returning to a value of '0').

Figure 3:
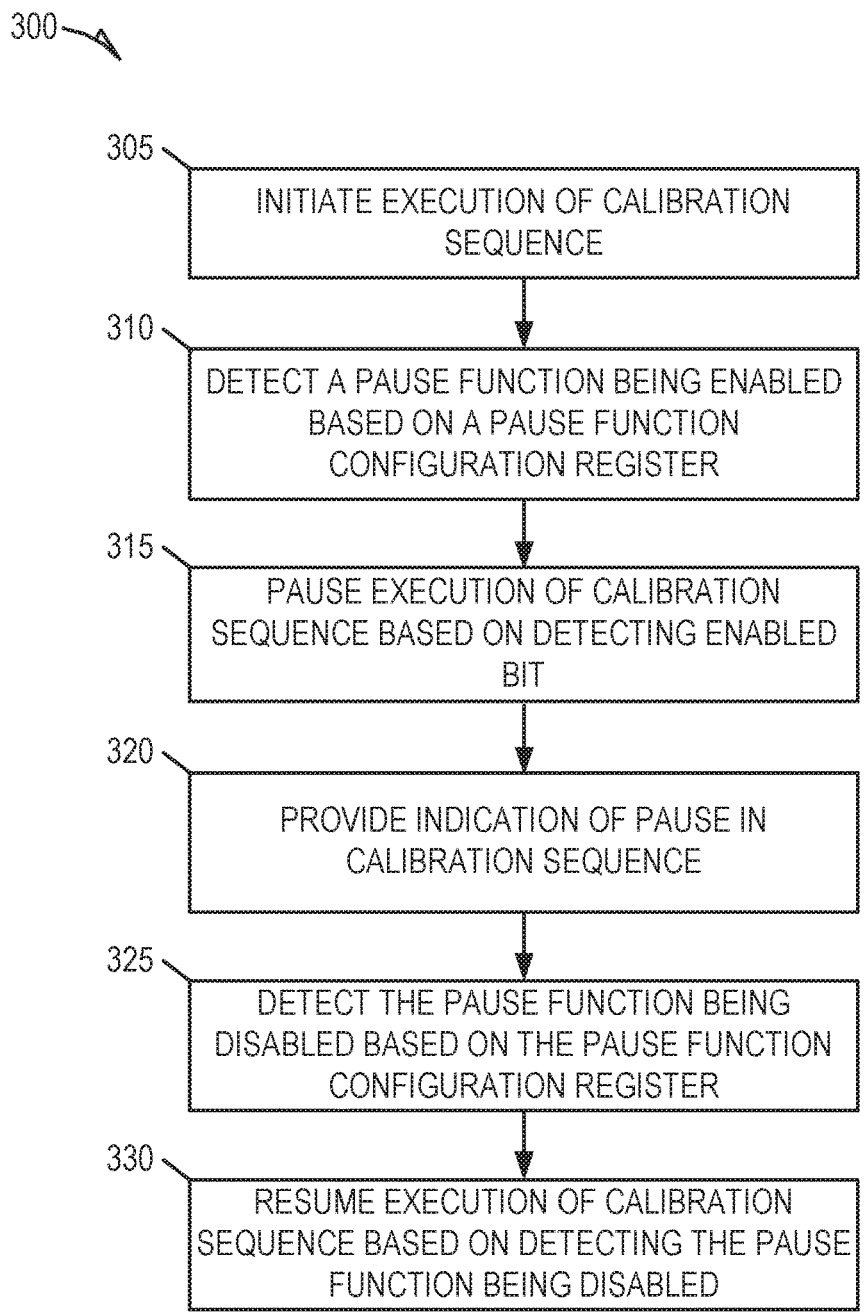
FIG. 3 is a flow diagram illustrating operations of a calibration control component in performing a method for executing a calibration sequence, according to some example embodiments.

FIG. 3 is a flow diagram illustrating operations of a calibration control component in performing a method for executing a calibration sequence, according to some example embodiments. Depending on the embodiment, an operation of the method 300 may be repeated in different ways or involve intervening operations not shown. Though the operations of the method 300 may be depicted and described in a certain order, the order in which the operations are performed may vary among embodiments, including performing certain operations in parallel.

At operation 305, the calibration control component initiates execution of a calibration sequence at a physical layer device. The calibration sequence comprises a set of calibration functions that are sequentially executed. To initiate execution of a calibration function, the calibration control component issues a control signal to one or more calibration components of the physical layer device.

The calibration control component, at operation 310, detects a pause function being enabled based on a pause configuration register. More specifically, the calibration control component detects the pause function being enabled based on an enabled bit in the configuration register. That is, the enabled bit in the pause function configuration register indicates that a pause function is enabled. The bit in the pause function configuration register can be enabled by system software prior to initiation of the calibration sequence.

The calibration control component pauses execution of the calibration sequence based on detecting the enabled bit, at operation 315, and provides an indication that the calibration sequence is paused (operation 320). As an example, the enabled bit is mapped to a particular calibration function in the calibration sequence, and in response to the bit being enabled, the calibration control can pause execution of the calibration sequence prior to or after execution of the calibration function corresponding to the enabled bit. The calibration control component can provide the indication that the calibration sequence is paused to a pause indication register. That is, the calibration control component can provide the indication by programming a bit in the pause indication register. The pause indication register can simply indicate that the calibration sequence has been paused or can more specifically indicate where in the calibration sequence the pause occurs. For example, the pause indication register can include a plurality of bits, where each bit indicates a pause with respect to a particular calibration function (either before or after).

As noted above, the calibration control component can initiate execution of a calibration function by sending a control signal to a calibration component that performs the calibration function. In some embodiments, the enabled bit in the pause function configuration register can mask out the control signal provided by the calibration control component to a calibration component, thereby preventing the execution of the calibration function. In some embodiments, the enabled bit in the pause function configuration register is used as an input to a state machine (e.g., one of the state machines 115) within the calibration control component that controls execution of the calibration sequence. Consistent with these embodiments, the enabled bit, when provided as an input to the state machine, causes the state machine to introduce the pause in the calibration sequence.

At operation 325, the calibration control component detects the pause function being disabled based on the pause configuration register. More specifically, the calibration control component detects the previously enabled bit being disabled. The bit being disabled indicates that the pause function is disabled.

The calibration control component, at operation 330, resumes execution of the calibration sequence based on detecting the pause function being disabled. Consistent with some embodiments, once the bit is disabled, the corresponding control signal is unmasked, thereby resulting in the corresponding calibration component receiving the control signal and executing the calibration function.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A calibration system comprising:
    a calibration control component to control execution of a calibration sequence in a device, the calibration sequence comprising a set of calibration functions that are sequentially executed; and
    a pause function configuration register storing an indication of an enabled pause function, wherein the calibration control component pauses execution of the calibration sequence prior to or after execution of a particular calibration function in the set of calibration functions based on the enabled pause function.

2. The calibration system of claim 1, wherein the calibration control component performs further detects the pause function being disabled; and
    resumes execution of the calibration sequence based on detecting the pause function being disabled.

3. The calibration system of claim 2, wherein:
    the indication of the enabled pause function comprises an enabled bit in the pause function configuration register; and
    detecting the pause function being disabled comprises detecting the enabled bit being disabled.

4. The calibration system of claim 1, wherein:
    the pause function configuration register indicates whether the calibration control component is to pause execution of the calibration sequence prior to or after execution of the particular calibration function.

5. The calibration system of claim 1, wherein:
    the pause function configuration register comprises a set of bits, each bit in the set of bits corresponding to one of the set of calibration functions; and
    the particular calibration function in the set of calibration functions corresponds to a particular bit in the set of bits.

6. The calibration system of claim 5, wherein:
    the bit in the set of bits is enabled;
    the calibration control component provides a control signal to cause a calibration component to execute the particular calibration function; and
    the bit being enabled causes the control signal to be masked.

7. The calibration system of claim 1, wherein:
    the calibration sequence includes a first number of calibration functions; and
    the pause function configuration register comprises a second number of bits, wherein the second number is greater than the first number.

8. The calibration system of claim 1, wherein the calibration control component further provides an indication of a pause in the calibration sequence.

9. A method comprising:
    initiating execution of a calibration sequence at a device, the calibration sequence comprising a set of calibration functions that are sequentially executed;
    detecting a pause function being enabled based on an enabled bit in a pause function configuration register; and
    pausing execution of the calibration sequence at the device prior to or after execution of a particular calibration function in the set of calibration functions based on detecting the pause function being enabled.

10. The method of claim 9, further comprising:
    detecting the pause function being disabled; and resuming execution of the calibration sequence based on detecting the pause function being disabled.

11. The method of claim 10, wherein:
detecting the pause function being disabled comprises detecting the enabled bit being disabled.

12. The method of claim 9, wherein:
the enabled bit indicates whether to pause execution of the calibration sequence prior to or after execution of the particular calibration function.

13. The method of claim 9, wherein:
the pause function configuration register comprises a set of bits, the enabled bit in the set of bits being associated with the particular calibration function in the set of calibration functions.

14. The method of claim 13, wherein:
the set of calibration functions includes a first number of calibration functions; and
the pause function configuration register comprises a second number of bits, wherein the second number is greater than the first number.

15. The method of claim 13, further comprising masking a control signal provided to a calibration component that performs the particular calibration function.

16. The method of claim 9, further comprising providing an indication of a pause in the calibration sequence.

17. A physical layer device comprising:
a set of lanes, each lane comprising a transmitter or a receiver;
a set of calibration components to execute a calibration sequence on each lane, the calibration sequence comprising a set of sequentially executed calibration functions; and
a calibration control component to control execution of the calibration sequence, the calibration control component to pause execution of the calibration sequence prior to or after execution of a particular calibration function in the set of calibration functions based on an indication of an enabled pause function in a pause function configuration register.

18. The physical layer device of claim 17, wherein the calibration control component performs further operations comprising:
detecting the pause function being disabled; and
resuming execution of the calibration sequence based on detecting the pause function being disabled.

19. The physical layer device of claim 18, wherein:
the indication of the enabled pause function comprises an enabled bit in the pause function configuration register; and
detecting the pause function being disabled comprises detecting the enabled bit being disabled.

20. The physical layer device of claim 17, wherein:
the pause function configuration register comprises a set of bits, each bit in the set of bits corresponding to one of the set of calibration functions; and
the particular calibration function in the set of calibrations corresponds to a particular bit in the set of bits.

* * * * *